June 20, 1933.   P. W. FLOYD   1,915,223
SANITARY DEVICE FOR MILK BOTTLES OR THE LIKE
Filed Sept. 25, 1930   2 Sheets-Sheet 1
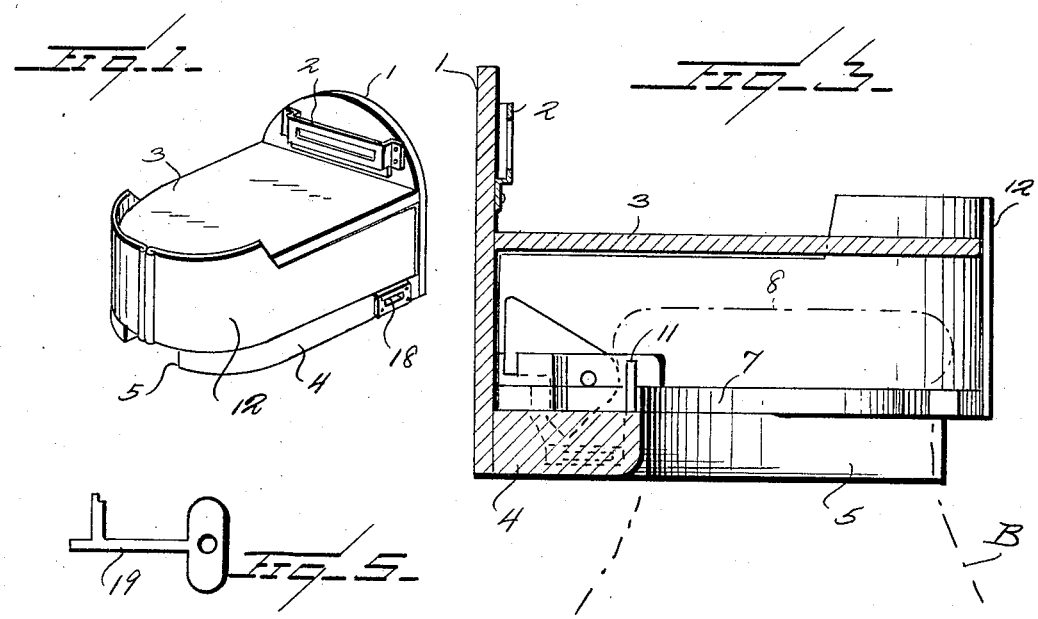
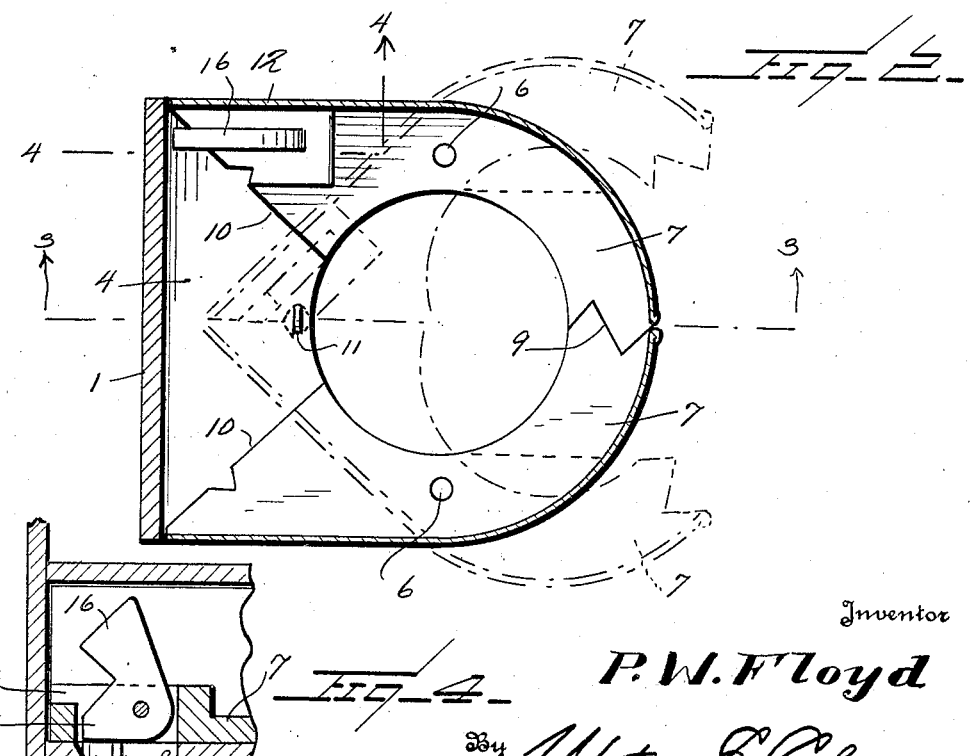
Inventor
P. W. Floyd
By Watson E. Coleman
Attorney June 20, 1933. P. W. FLOYD 1,915,223
SANITARY DEVICE FOR MILK BOTTLES OR THE LIKE
Filed Sept. 25, 1930 2 Sheets-Sheet 2
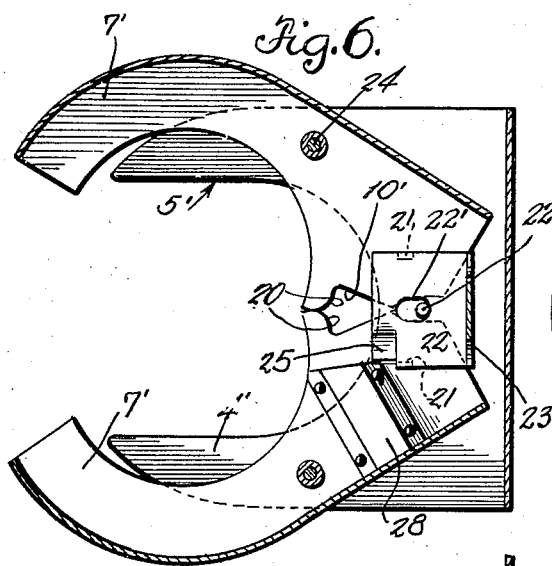
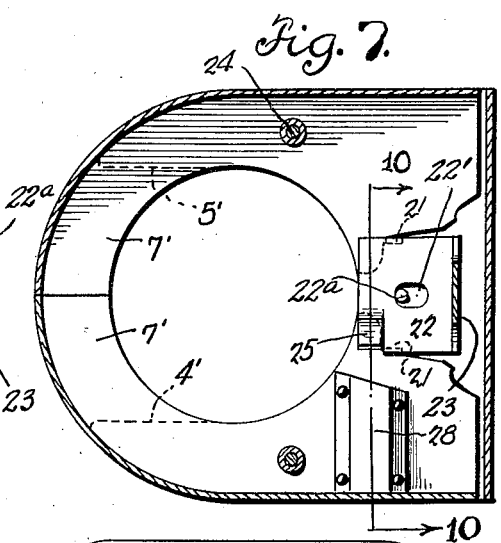
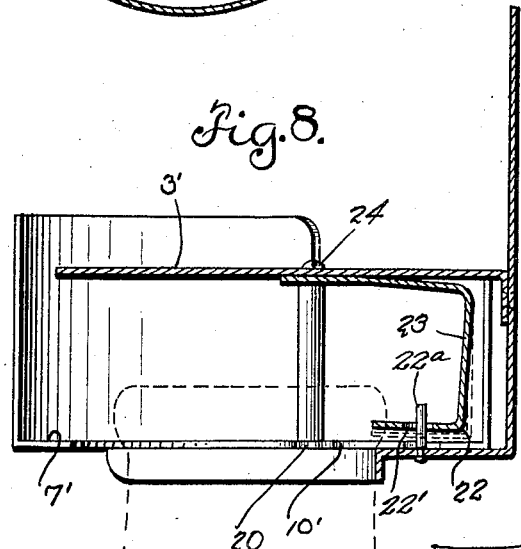
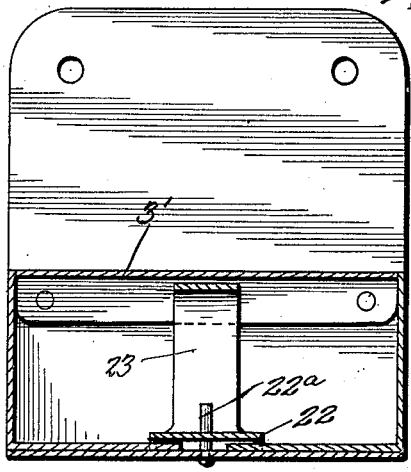
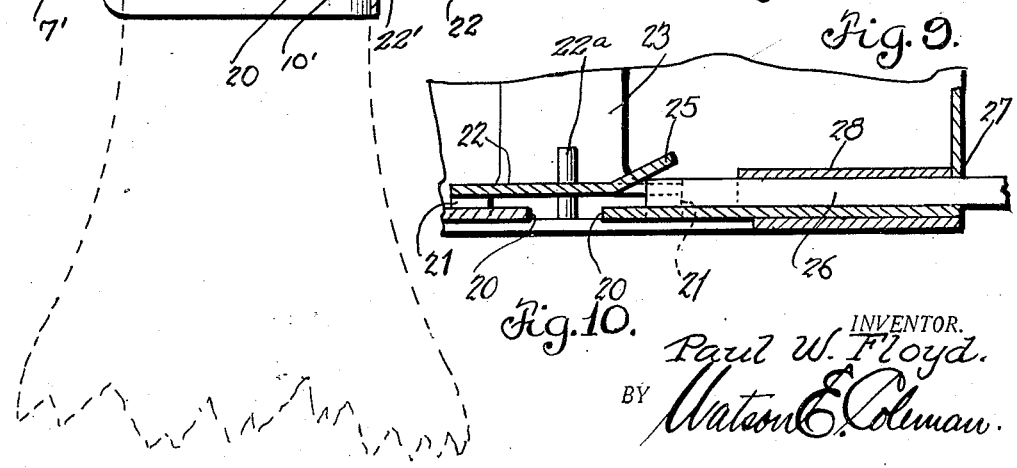
INVENTOR.
Paul W. Floyd.
BY Watson E. Coleman.
ATTORNEY.

Patented June 20, 1933

1,915,223

UNITED STATES PATENT OFFICE

PAUL W. FLOYD, OF HARRISBURG, PENNSYLVANIA

SANITARY DEVICE FOR MILK BOTTLES OR THE LIKE

Application filed September 25, 1930. Serial No. 484,423.

This invention relates to a sanitary device for milk bottles or the like and it is an object of the invention to provide a device of this kind adapted to be applied to the neck end of a milk bottle or the like in order to prevent unauthorized removal of a conventional bottle cap and thus provide an effective means to protect against bacteria and infection, resulting from cats and dogs licking over the rim or cap of the milk bottle or as may be transmitted by flies or other insects and dust and dirt.

The invention also has for an object to provide a device of this kind which provides an effective means to keep milk clean as when applied it completely closes the top of the milk bottle, thus keeping it entirely sanitary.

Another object of the invention is to provide a device of this kind comprising two relatively movable jaws adapted to have locking engagement with a milk bottle or the like, together with means for holding said jaws against separating movement.

Another object of the invention is to provide a device of this kind comprising two relatively removable jaws adapted to have locking engagement with a milk bottle or the like, together with means for holding said jaws against separating movement and wherein said means is ineffective until after a bottle has been operatively engaged between the jaws.

The invention consists in the details of construction and in the combination and arrangement of the several parts of my improved locking device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective of a sanitary device constructed in accordance with an embodiment of my invention with the locking jaws closed;

Figure 2 is a horizontal sectional view taken through the device illustrated in Figure 1, the open position of the jaws being indicated by broken lines;

Figure 3 is a sectional view taken substantially on the line 3—3 of Figure 2;

Figure 4 is a fragmentary detailed sectional view taken substantially on the line 4—4 of Figure 2, the associated key being shown in position to release the locking member for the jaws;

Figure 5 is a view in elevation of the key unapplied;

Figure 6 is a view partly in top plan and partly in section illustrating a device constructed in accordance with a further embodiment of my invention with the jaws in open position;

Figure 7 is a view similar to Figure 6 showing the jaws in a closed position;

Figure 8 is a view partly in elevation and partly in vertical section, a coacting bottle being diagrammatically illustrated by broken lines;

Figure 9 is a transverse vertical sectional view taken through the device as herein disclosed;

Figure 10 is a vertical sectional view taken on the line 10—10 of Figure 7.

As disclosed in the accompanying drawings, my improved device comprises a back plate 1 of desired dimensions which is adapted to be secured or anchored in any preferred manner upon a suitable support. Associated with the upper portion of this plate 1 is a card holder 2 of any preferred construction. The plate 1 has projecting forwardly therefrom a top plate 3 and a bottom plate 4. The bottom plate 4 has its forward portion cut out or recessed, as at 5, and in which cut out or recessed portion 5 is adapted to be freely received the neck portion of a milk bottle B or the like.

Pivotally connected, at 6, with the bottom plate 4 at opposite sides of the cut out portion or recess 5 are the arcuate jaws 7 which, when swung inwardly one toward the other snugly engage around the neck portion of the bottle B and coact with the top flange 8 thereof and the bottom plate 4 to effectually hold the bottle B against displacement.

When these jaws 7 are fully closed they entirely surround the neck of the bottle B and the outer meeting ends thereof are toothed, as at 9, to interlock in order to further facilitate the desired locking engagement with the bottle B.

When the jaws 7 are separated the neck portion of the bottle B may be readily applied within or removed from the recess or cut out portion 5 and the position of the jaws 7 when in their fully open relation is such that as the neck portion of the bottle is entered within the recess or cut out portion 5 the jaws 7 will be caused automatically to swing into their fully closed position or into position encircling the bottle neck.

The inner ends of the jaws 7 are inclined, as at 10, on desired angles so that the contact of said inclined end edges 10 limit the extent of opening or separating movement of the jaws 7. The extent of outward or separating movement of each of the jaws is further limited by the upstanding pin 11 carried by the base plate 4 inwardly of but immediately adjacent to the cut out portion or recess 5 and at the transverse center thereof. The peripheral portions of the jaws 7 carry the upstanding plates 12 which, when the jaws 7 are in their closed position, substantially bridge the space between the plates 3 and 4 and thus prevent unauthorized access to the conventional cap applied within the mouth of the bottle.

The inner end portion of one of the jaws 7 is provided therethrough with a slot 14 in which is pivotally mounted a dog 15. The pivoted end portion of the dog 15 is provided with an upstanding extension 16 inclined in a direction toward the free end of the dog 15 whereby it is assured that such free end portion of the dog 15 will drop or swing downwardly by gravity so as to engage within a pocket or recess 17 provided in the upper surface of the bottom plate 4 when the opening or slot 14 is in register therewith.

This opening or slot 14 registers with the pocket or recess 17 when the jaw 7 carrying the dog 15 is in its fully closed position and at which time said jaw 7 is also in interlocking engagement with the second jaw 7. The pocket or recess 17 has in communication therewith an opening 18 whereby a key 19, herein disclosed as of a blade type, can be employed for raising the dog 15 when it is desired to remove the bottle B.

While I have hereinbefore stated that the back plate 1 may be anchored to a suitable support, it is also to be understood that the device in its entirety can be applied to the neck end of a milk bottle or the like in order to prevent unauthorized removal of a conventional bottle cap and that the device can be so used without being anchored to a support. The device also provides an effective means to protect against bacteria and infection resulting from cats and dogs licking over the rim or cap of the milk bottle or as may be transmitted by flies or other insects and dust and dirt. The device provides an effective means to keep milk clean as when applied it completely closes the top of the milk bottle, thus keeping it perfectly sanitary.

In the embodiment of the invention as illustrated in Figures 6 to 10 inclusive, the relatively movable jaws 7' have their inner ends recessed at 10' to provide shoulders 20 disposed one toward the other and behind which are adapted to be received depending lugs 21 carried by the opposite side portions of a plate 22. These lugs 21 also contact with the inner or side edges of the recesses 10' so that the jaws 7' are effectively held or locked against opening movement.

The plate 22 extends forwardly from the lower portion of a depending spring plate 23 suitably anchored as at 24. The inherent resiliency of the plate 23 normally maintains the plate 22 projected slightly in advance of the inner part of the cut-out portion 5' of the bottom plate 4' so that when a bottle or the like is not engaged between the jaws 7' said jaws 7' may be swung one toward the other without effecting a locking of said jaws thereon in closed position. This is due to the fact that with the plate 22 projected as just mentioned, the lugs 21 will at all times ride upon the inner portions of the jaws 7' as said lugs 21 will not drop into locking position until after the plate 22 has been forced inwardly sufficient to bring the lugs 21 behind the shoulders 20. When a bottle is applied between the jaws 7', contact of such bottle with the projected plate 22 inwardly will effect the desired locking of the jaws 7' around the neck of the bottle.

The plate 22 in its central portion is provided with a slot 22' through which extends in upstanding pin 22a carried by the bottom wall 4' whereby the plate 22 is at all times maintained in desired working position.

One side marginal portion of the plate 22 is formed with an upstanding lip 25 between which and the inner end portion of the jaws thereon when the lugs 21 are in locking position is adapted to be engaged the inner or inserted extremity of a key 26 which when in use is directed through a suitably positioned opening 27 and guide member 28. As this key 26 is forced inwardly, it passes between the lip 25 and the inner portion of a jaw 7' resulting in a sufficient lifting of the plate 22 to free the lugs 21 from said jaws 7', whereupon the inherent resiliency of the plate 23 will cause the plate 22 to spring into position shown in Figure 8 and to maintain such position until forced inwardly again upon application of the bottle.

This application is partly in continuation of my application, Serial No. 470,460, filed July 24, 1930.

From the foregoing description it is thought to be obvious that a locking device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described, comprising two spaced plates, one of said plates having a recess to receive the neck portion of a milk bottle or the like, swinging jaws mounted upon one of the plates for engagement around the neck portion of the bottle received within the recess, plates carried by the outer marginal portions of the jaws, said last named plates closing the space between the two first named plates when the jaws are in closed position, and coacting means carried by one of the jaws and a plate for locking the jaws against separating movement.

2. A device of the class described comprising swinging jaws movable one toward the other for engagement around the neck portion of a bottle, a spring plate, means for supporting said plate for movement in a direction angular to the plane of movement of the jaws, the resiliency of said plate normally maintaining the plate free of the jaws and in position for contact with the neck of the bottle inserted between the jaws, and means carried by the plate and operating upon movement of the plate in one direction to lock the jaws when closed.

3. A device of the class described comprising swinging jaws movable one toward the other for engagement around the neck portion of a bottle, a spring plate, means for supporting said plate for movement in a direction angular to the plane of movement of the jaws, the resiliency of said plate normally maintaining the plate free of the jaws and in position for contact with the neck of the bottle inserted between the jaws, means carried by the plate and operating upon movement of the plate in one direction to lock the jaws when closed, and a lip carried by the plate for engagement by a key to release the plate from the jaws while the jaws are engaged around the neck of a bottle.

4. A device of the class described comprising two spaced plates, one of said plates having a recess to receive the neck portion of a milk bottle or the like, jaws supported between said plates for engagement around the neck portion of the bottle received within the recess, a resilient plate carried by one of the first named plates, a locking plate carried by the resilient plate, said resilient plate normally maintaining the locking plate free of the jaws and slightly projected within the recess in one of the first named plates, and means carried by the locking plate engageable with the jaws when closed and upon movement of the locking plate in one direction by contact therewith of the neck of the bottle to hold said jaws in engagement around the neck of the bottle.

5. A device of the class described comprising two spaced plates, one of said plates having a recess to receive the neck portion of a milk bottle or the like, jaws supported between said plates for engagement around the neck portion of the bottle received within the recess, a resilient plate carried by one of the first named plates, a locking plate carried by the resilient plate, said resilient plate normally maintaining the locking plate free of the jaws and slightly projected within the recess in one of the first named plates, lugs carried by the locking plate for contact with the jaws when closed to hold the jaws against separating movement.

6. A device of the class described comprising two spaced plates, one of said plates having a recess to receive the neck portion of a milk bottle or the like, jaws supported between said plates for engagement around the neck portion of the bottle received within the recess, a resilient plate carried by one of the first named plates, a locking plate carried by the resilient plate, said resilient plate normally maintaining the locking plate free of the jaws and slightly projected within the recess in one of the first named plates, lugs carried by the locking plate for contact with the jaws when closed to hold the jaws against separating movement, said locking plate being provided with a slot, and a pin carried by one of the spaced plates and disposed through the slot to allow said pin to maintain the locking plate in desired working position.

7. A device of the class described comprising two spaced plates, one of said plates having a recess to receive the neck portion of a milk bottle or the like, jaws supported between said plates for engagement around the neck portion of the bottle received within the recess, a resilient plate carried by one of the first named plates, a locking plate carried by the resilient plate, said resilient plate normally maintaining the locking plate free of the jaws and slightly projected within the recess in one of the first named plates, lugs carried by the locking plate for contact with the jaws when closed to hold the jaws against separating movement, an upstanding lip carried by a side marginal portion of the locking plate, one of the first named plates having a keyway substantially aligned with said lip when the lugs of the locking plate are engaged with the jaws, and a key slidably engageable through the keyway to engage the lip to move the locking plate away from the jaws to free the lugs from the jaws.

In testimony whereof I hereunto affix my signature.

PAUL W. FLOYD.